(12) United States Patent
Light et al.

(10) Patent No.: US 6,377,256 B1
(45) Date of Patent: Apr. 23, 2002

(54) ASSISTED CAMERA ORIENTATION AND POSITIONING DURING OBJECT MANIPULATION IN A THREE-DIMENSIONAL SCENE

(75) Inventors: John J. Light, Beaverton; John D. Miller, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/220,845

(22) Filed: Dec. 24, 1998

(51) Int. Cl.[7] ............................................. G06T 15/00
(52) U.S. Cl. ..................................... 345/419; 345/473
(58) Field of Search ............................... 345/419, 418, 345/473, 427, 420

(56) References Cited

U.S. PATENT DOCUMENTS

| | | | | |
|---|---|---|---|---|
| 5,461,709 A | * | 10/1995 | Brown | 345/157 |
| 5,689,628 A | * | 11/1997 | Robertson | 345/427 |
| 6,016,147 A | * | 1/2000 | Gantt | 345/420 |
| 6,072,478 A | * | 6/2000 | Kurihara et al. | 345/302 |

* cited by examiner

Primary Examiner—Cliff N. Vo
Assistant Examiner—Huedung X. Cao
(74) Attorney, Agent, or Firm—Kenyon & Kenyon

(57) ABSTRACT

A system manipulates an object in a three-dimensional graphical scene that includes a graphical camera in a first position and a first orientation. The system receives an object manipulation indication and identifies an improved viewing location of the camera for manipulation the object. The system then moves the camera to a second position and second orientation based on the improved viewing location. Finally, the system receives an end of object manipulation indication and moves the camera back to the first position and first location.

26 Claims, 3 Drawing Sheets

ASSISTED CAMERA ORIENTATION AND POSITIONING DURING OBJECT MANIPULATION IN A THREE-DIMENSIONAL SCENE

SUMMARY OF THE INVENTION

The present invention is directed to three-dimensional computer graphics. More particularly, the present invention is directed to manipulation objects in a three-dimensional computer graphics scene.

BACKGROUND OF THE INVENTION

Three-dimensional ("3-D") computer graphics programs are rapidly increasing in popularity because, for one, they allow graphical scenes to appear more realistic on a two-dimensional ("2-D") computer display. However, one problem with the typical 3-D computer graphics program is placing and manipulating objects in a 3-D scene. Placement is typically not a problem in 2-D scenes (e.g., drawing programs) because both relevant dimensions are directly visible to the user. Because 3-D scenes are limited to projections of the scene onto a 2-D computer display or screen, direct manipulations of objects is more difficult. Further compounding the difficulty is that most scenes are presented with a perspective projection (making objects in the back appear smaller) to aid in the visual interpretation of the scene.

The most common input device for 3-D graphics programs is a computer mouse, which is inherently a 2-D device in spite of the recent addition of a wheel to some models. A common way to map mouse input signals to object movement is to have two or more modes. In one mode, mouse movement maps to movement of the object in a plane parallel to the screen. In another mode (e.g., when a keyboard key is pressed) mouse movement maps to movement in an orthogonal plane (e.g., parallel to the apparent floor of the scene). The mouse movement is always one to one with cursor movement, but the relationship of cursor movement to object movement can be important. A common cursor-object mapping is to interpret a fixed cursor movement with a fixed movement in the scene.

Another known method of cursor-object mapping is referred to as "projective mapping", in which the object position, constrained by the movement plane, stays under the cursor. Typically, a projective mapping also implies that object movement is constrained to planes oriented with the scene rather than to a graphical "camera" that determines the field of view of the user. This mapping is not linear in the 3-D scene (equivalent cursor movements further away give larger object movements than those closer), but gives the user the feeling that the user is actually holding the object, since the object remains under the cursor.

One problem with projective mapping occurs when the plane of movement is very nearly parallel to the line between the eye-point, or "camera", and the object. In this case, very small movements of the cursor result in very large movements of the object. For example, the difference between the object up front versus the object at the back may be only a handful of pixels on the screen, so a very small cursor movement results in a huge object movement. In a severe case, there may be no pixel difference, and the user won't be able to move the object at all.

The common solution to this problem is for the user to move the viewing position to one in which the user has more control over the object. However, this solution generates at least two problems. First, the user must choose and move to an appropriate position for successful object manipulation. Second, the user usually really wanted to be in the original position, so the user is now faced with the job of returning to it after the manipulation. The user often deals with the first problem by making a minimal movement. The user does this because movement in 3-D scenes, especially ones involving changes in viewing angle, are difficult, and therefore the user wants to minimize this difficulty for both the first move and the return. The result of this minimal move is often that it is too minimal, not providing enough control over the object. After losing time trying to make the placement in the first new position, the user moves to a more advantageous location. While this may solve the manipulation problem, the intermediate move wastes time and increases the difficulty associated with returning to the original location.

Based on the foregoing, there is a need for an improved apparatus and method for manipulating objects in a 3-D graphical scene.

SUMMARY OF THE INVENTION

One embodiment of the present invention is a system for manipulating an object in a three-dimensional graphical scene that includes a graphical camera in a first position and a first orientation. The system receives an object manipulation indication and identifies an improved viewing location of the camera for manipulating the object. The system then moves the camera to a second position and second orientation based on the improved viewing location. Finally, the system receives an end of object manipulation indication and moves the camera back to the first position and first location.

DETAILED DESCRIPTION

One embodiment of the present invention enhances the manipulation of an object in a 3-D computer graphics scene by automatically moving the camera to an improved viewing location, and then moving the camera back to its original location when the manipulation of the object is completed.

Figure 1:
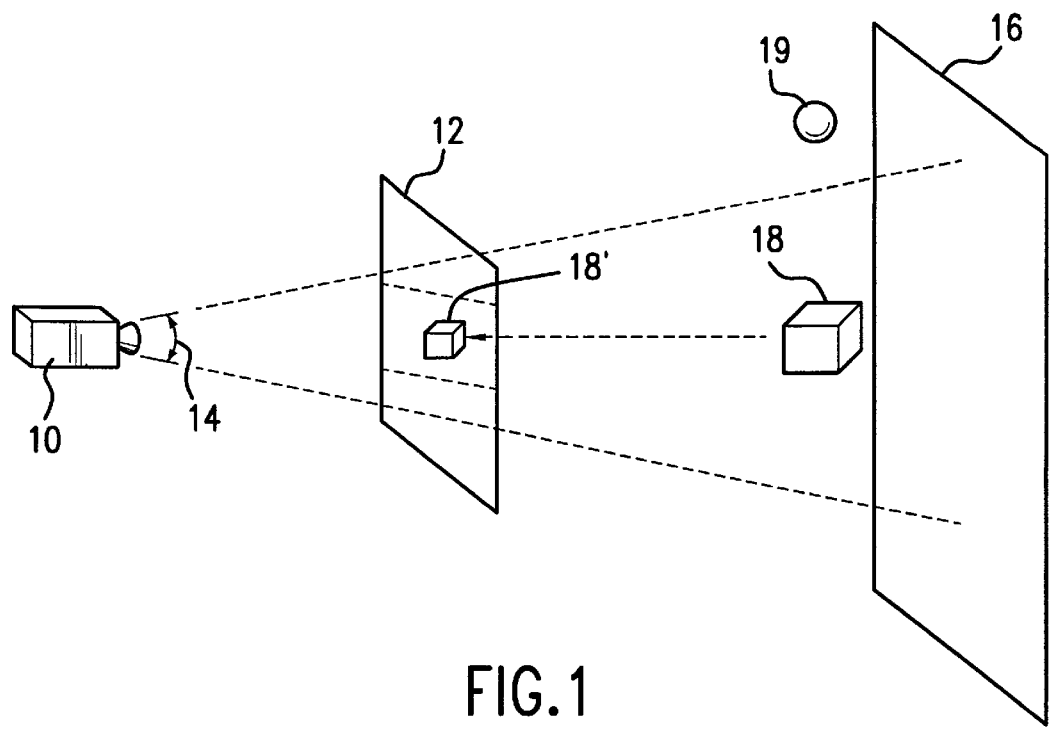
FIG. 1 illustrates the internal workings of a 3-D computer graphics scene.

FIG. 1 illustrates the internal workings of a 3-D computer graphics scene. The 3-D scene of FIG. 1 is intended to be a simulated 3-D graphics that is displayed to a user on a flat, 2-D computer display.

The scene includes an eye position or graphical "camera" 10 which determines which objects appear to the user in the 3-D scene. Camera 10 projects out at a field of view, or angle 14. Angle 14 determines how much area is seen by camera 10.

The scene further includes a near plane 12 and a far plane 16. Near plane 12 and far plane 16 define an area, referred to as a "viewing frustrum" where objects viewed by camera 10 reside. In FIG. 1, objects 18 (a cube) and 19 (a sphere) are within the viewing frustrum formed by near plane 12 and far plane 16, but only object 18 is viewable by camera 10 because it falls within angle 14. Near plane 12 includes a front plane of the frustrum where objects are projected for display on the computer display. Object 18 is projected onto the front plane of the frustrum as object 18'.

In the 3-D scene of FIG. 1, two types of movement that require user interaction are available. One movement involves changing the location of camera 10 in order to change the view seen by the user on the computer display. Among other things, in changing the location both the position and orientation of the camera can be changed. This is referred to as "navigating" or "moving" camera 10. Further, the user can move objects 18 and 19, which is referred to as "manipulating" the objects. In the present invention, objects are manipulated by attaching the cursor to the desired object, and moving the mouse. The selected object tracks the movement of the cursor.

Figure 2:
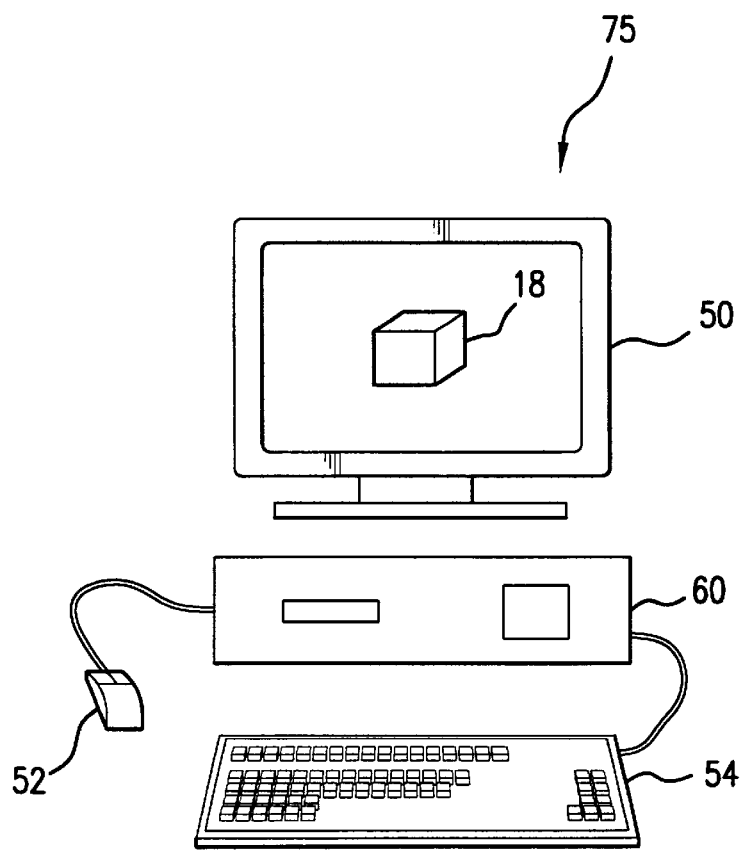
FIG. 2 is a block diagram of one embodiment of a computer system that can implement the present invention.

FIG. 2 is a block diagram of one embodiment of a computer system that can implement the present invention. Computer system 75 includes a keyboard 54, a mouse 52, a system unit 60 and a computer display 50. System unit 60 includes a processor, memory, and other known computer components. Display 50 displays objects captured by camera 10 of FIG. 1 that appear in the front plane of the frustrum. Therefore, in the example of FIG. 1, display 50 shows object 18.

Figure 3:
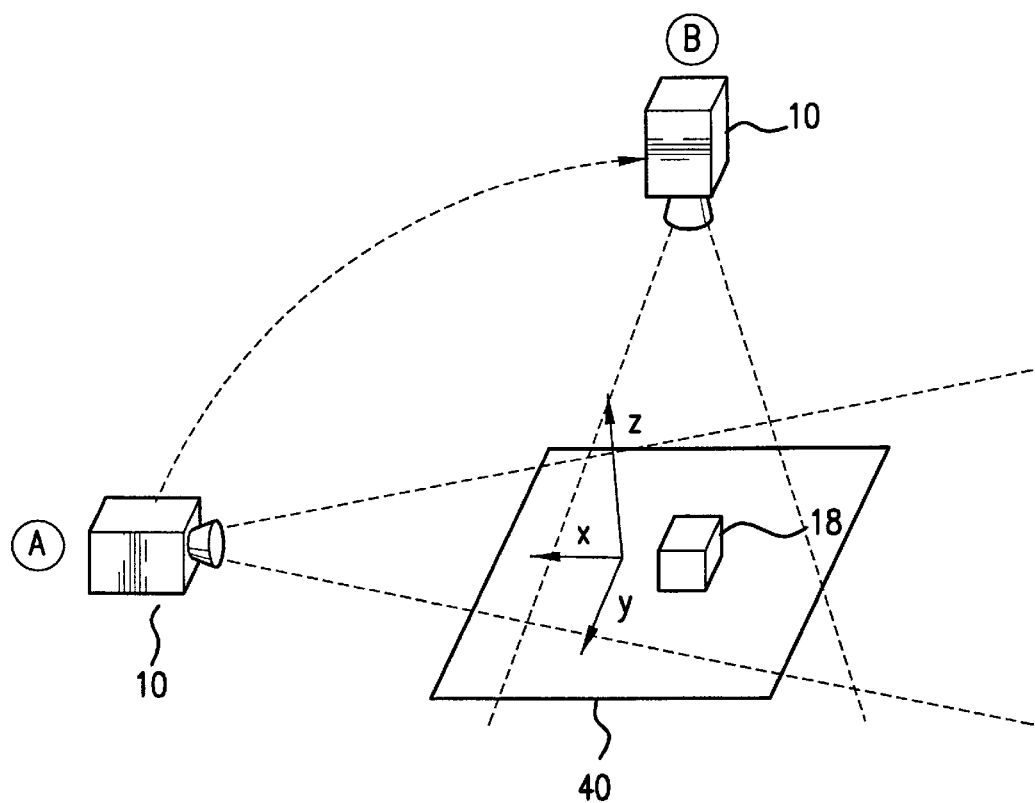
FIG. 3 illustrates an example of how a camera is moved during object manipulation.

The present invention automatically moves camera 10 to a more appropriate or improved location when a user desires to manipulate an object. FIG. 3 illustrates an example of how camera 10 is moved during object manipulation. FIG. 3, similar to FIG. 1, shows camera 10 in conjunction with a 3-D object 18. FIG. 3 does not show near plane 12 or far plane 16, but does illustrate a "floor" 40 that provides a perspective on the directions object 18 can be manipulated.

Object 18 can be manipulated in either an x, y, or z direction relative to floor 40. Some directions of movement of object 18 can be more easily visualized by a user via computer display 50 depending on the location of camera 10. For example, when camera 10 is in location A of FIG. 3, the user can easily visualize movement of object 18 in the y and z direction which forms a plane parallel to camera 10. However, in location A, movement of object 18 in the x direction, which is perpendicular to camera 10, is more difficult for the user to visualize. Similarly, when camera 10 is in location B of FIG. 3, the user can easily visualize movement of object 18 in the x and y direction, but not in the z direction.

Therefore, depending on the direction that the user wishes to move object 18, the present invention automatically moves camera 10 to an advantageous location for the user. For example, if the user indicates the desire to move object 18 in the x, y direction of floor 40, camera 10 may be automatically moved to location B. This allows the user to easily visualize the movement of object 18. When the user is finished manipulating object 18, camera 10 is then automatically moved back to its original location A.

Figure 4:
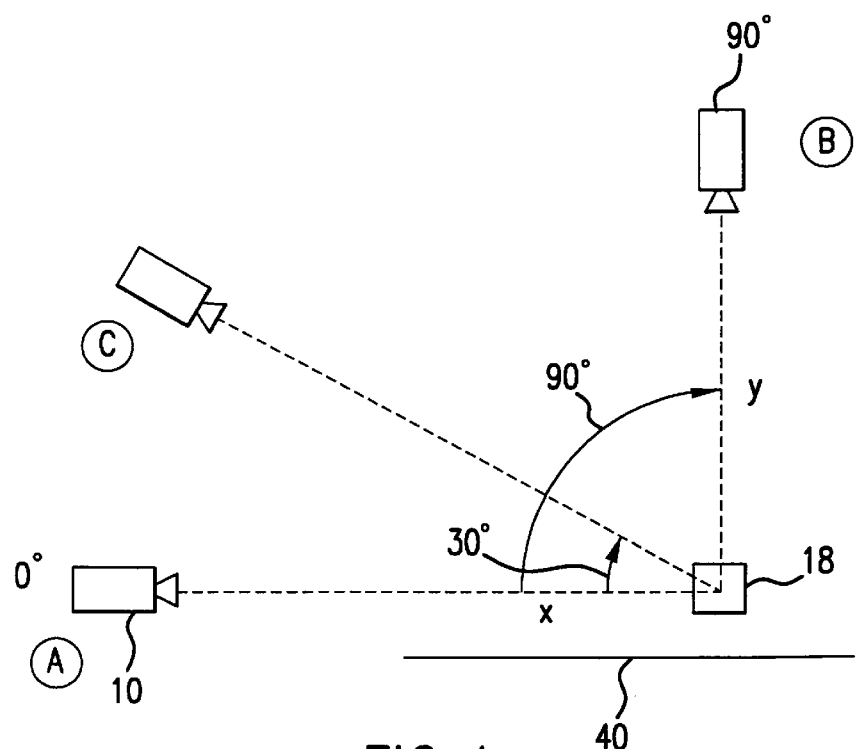
FIG. 4 illustrates only the x, z plane of FIG. 3.

For simplicity purposes, FIG. 4 illustrates only the x, z plane of FIG. 3. As discussed, the location of camera 10 may be defined by the position of camera 10 and the orientation of camera 10. In location A, the position of camera 10 is approximately 0 degrees relative to the x/y intersection, and the orientation is along the x axis. In contrast, in location B, the position of camera 10 is approximately 90 degrees away from the position of camera 10 at location A, and the orientation is along the z axis. In location A it is easy to visualize movement along the z axis, but not along the x ax is. In contrast, in location B it is easy to visualize movement along the x axis, but not along the z axis. In a further location shown in FIG. 4, location C, the position of the camera is approximately 30 degrees away from the position of camera 10 at location A.

Referring again to FIG. 3, in one embodiment of the present invention, when a user desires to manipulate object 18, or an other object, the user places a cursor on the object and presses, for example, the left key of mouse 52. This attaches the cursor to the object and the user can move mouse 52 and simultaneously drag the object to manipulate it. By only pressing the left key of mouse 52, the object will be dragged perpendicular to floor 40 (i.e., in the y, z plane). However, if the user wishes to drag the object in a direction parallel to floor 40 (i.e., in the x, y plane) or in any other non-y, z plane, the user, in addition to pressing the left key of mouse 52, presses a designated key on keyboard 54. In this embodiment, the pressing of the key on keyboard 54 functions as an object manipulation indication and informs computer system 75 that the user is moving the object. Computer system 75 then changes the location of camera 10 from location A to location B to provide the user with an improved viewing location of the object.

In another embodiment, to manipulate the object in any direction, the user places a cursor on the object and presses, for example, the left key of mouse 52. The user then moves mouse 52 to drag the object. When the user begins to move mouse 52, computer system 75 receives and object manipulation indication. Computer system 75 can then move camera 10 to an improved viewing location based on the object selected and the location of the object relative to camera 10.

Figure 5:
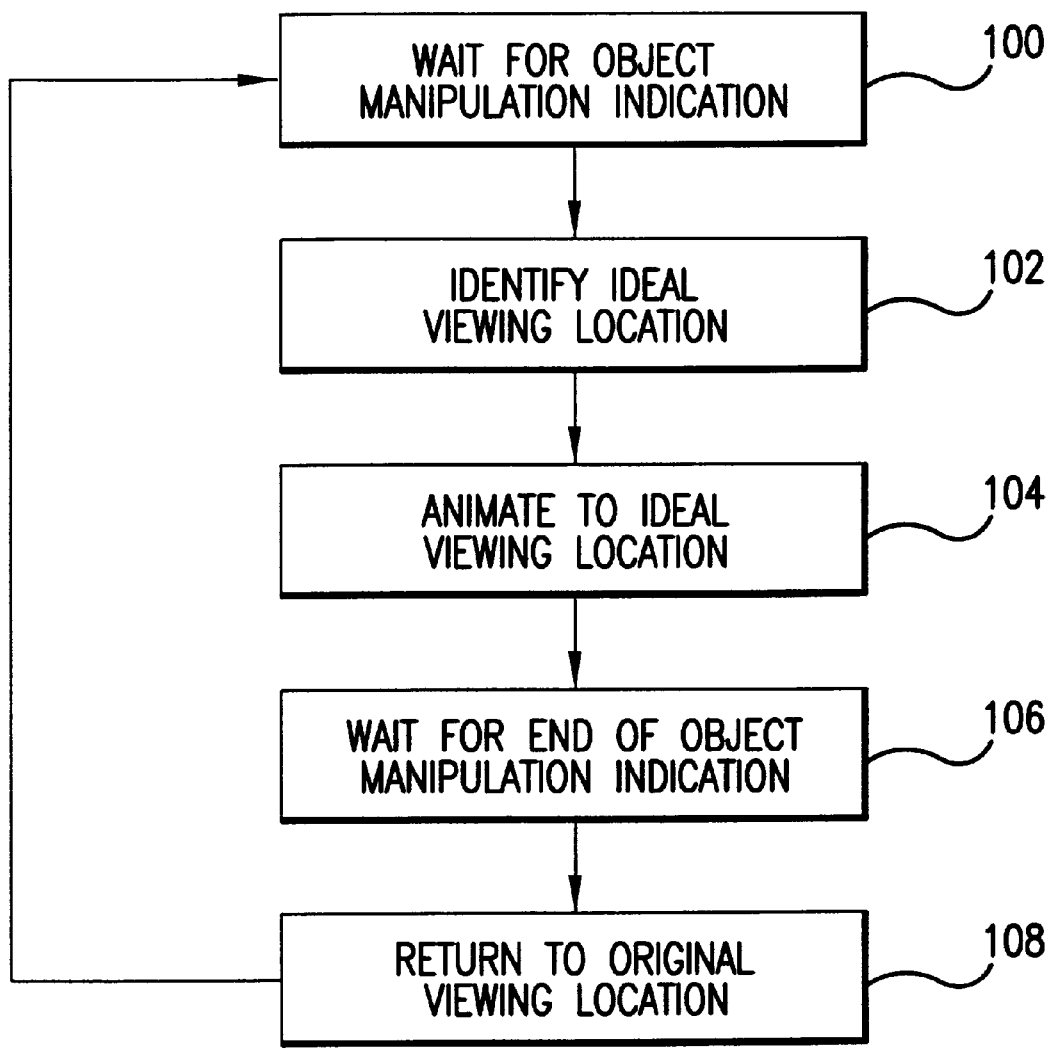
FIG. 5 is a flow chart illustrating the steps performed by the computer system in accordance with one embodiment of the present invention.

FIG. 5 is a flow chart illustrating the steps performed by computer system 75 in accordance with one embodiment of the present invention. The steps of FIG. 5 are performed when a user attempts to manipulate object 18 or any other object in a 3-D scene.

At step 100, system 75 waits for an indication that the user desires to manipulate object 18, or any other objects present in the 3-D scene. As discussed, in one embodiment the user selects the object by using mouse 52 and pressing a designated key on keyboard 54 when on object is to be manipulated, such as a function key. In this embodiment, the user pressed the designated key when the object will be moved in x, y plane parallel to floor 40. The pressing of the key provides an object manipulation indication.

In another embodiment, the user selects the object using mouse 52 and begins to manipulate the object by pressing a mouse button and moving mouse 52. The movement of mouse 52 provides an object manipulation indication.

In still another embodiment, additional input devices or interactions by the user can indicate object manipulation. For example, the user can indicate an object manipulation through a spoken command such as "Move Red Cube" if system unit 60 has voice recognition capability.

After system 75 receives an object manipulation indication, step 102 is performed. At step 102, system 75 identifies an improved viewing location of camera 10 based how the manipulation of object 18 was selected. In one embodiment, the viewing location is always perpendicular to floor 40 (i.e., location B of FIG. 4) as it is assumed that the user desires to move object 18 within the x, y plane. In this embodiment, camera 10 may be backed up to provide a larger area of floor 40 for the user to manipulate object 18.

In another embodiment, system 75 automatically determines the improved location of camera 10 based on the 3-D scene and the current location of object 18 within the scene.

In this embodiment, the improved viewing location is located between location A and location B of FIG. 3. The improved location of camera 10 should result in a reasonable ratio of movement of mouse 52 to the movement of object 18 on computer display 50, while minimizing the movement of camera 10 to achieve the reasonable ratio. The reasonable ratio allows the user to see the entire potential range of motion of object 18 and gives the user the impression of complete control over the object.

One way of determining a reasonable ratio is to predetermine a minimum number of pixels of apparent cursor movement that is required when a selected object is moved from background to foreground, and vice versa. In one embodiment, the minimum number of pixels is 100. The improved location of camera 10 is then calculated as the location that results in the minimum movement of camera 10 from location A that achieves the required number of pixels.

In still another embodiment, the improved location is approximately 16–30 degrees above location A of FIG. 4 (e.g., location C of FIG. 4). System 75 determines the current angle of camera 10 relative to the plane of the object selected. System 75 then selects 16 degrees or 30 degrees as the improved location depending on which is closest to the current angle.

At step 104, system 75 animates camera 10 to the improved viewing location. This step includes moving camera 10 from its original location (e.g., location A) to the location determined at step 102 (e.g., location B) and, during the movement, constantly displaying the view from camera 10. This allows the user to visualize the movement of camera 10 and recognize that the viewing location has been changed, thereby orienting the user to the new viewing location. After step 104 is performed, the user may then manipulate object 18 based on the new location of camera 10.

At step 106, system 75 waits for the end of object manipulation indication. This indication is typically the reverse of the object manipulation indication of step 100. For example, if a user has pressed a key to indicate object manipulation, system 75 will wait for the key to be released. If the object manipulation indication is based on movement of mouse 52, system 75 will wait for the button of mouse 52 to be released. Step 108 is then performed.

At step 108, system 75 returns camera 10 to the original location, thus providing the user with the original viewing location. As in step 104, the movement of camera 10 is also animated so that the user is oriented to the original viewing location. System 75 then returns to step 100 and waits for another object manipulation indication.

As described, the present invention automatically moves a camera in a 3-D graphic scene during object manipulation so a user has and improved viewing location. When the user has completed manipulation the object, the present invention automatically returns the camera to its original location.

Several embodiments of the present invention are specifically illustrated and/or described herein. However, it will be appreciated that modifications and variations of the present invention are covered by the above teachings and within the purview of the appended claims without departing form the spirit and intended scope of the invention.

For example, the embodiments illustrated use a mouse and a keyboard as input devices. However, the present invention can be practiced with any type of known input device.

What is claimed is:

1. A method of manipulating an object in a three-dimensional graphical scene that includes a graphical camera in a first position and a first orientation, said method comprising:

(a) receiving an object manipulation indication;
   (b) identifying an improved viewing location of the camera for manipulating the object;
   (c) moving the camera to a second position and second orientation based on said improved viewing location, wherein a location of said object relative to said graphical scene is maintained while the camera is moved;
   (d) receiving an end of object manipulation indication; and
   (e) moving the camera to said first position and first orientation.

2. The method of claim 1, wherein step (a) comprises detecting a pressed key of a keyboard.

3. The method of claim 2, wherein step (d) comprises detecting a release of said pressed key.

4. The method of claim 1, wherein step (a) comprises detecting movement of the object and step (d) comprises detecting a release of a mouse button.

5. The method of claim 1, wherein said first position and first orientation define a first parallel plane, and said second position and second orientation define a second parallel plane that is approximately 16–30 degrees from said first parallel plane.

6. The method of claim 1, wherein said first position and first orientation define a first parallel plane, and said second position and second orientation define a second parallel plane that is perpendicular to said first parallel plane.

7. The method of claim 1, wherein said improved viewing location is based on a location of said object and the three-dimensional graphic scene.

8. The method of claim 1, further comprising:

(f) attaching a cursor to said object; and
   (g) moving said cursor while said camera is in said position.

9. The method of claim 8, wherein said cursor is moved using a mouse.

10. A computer system comprising:

a processor;
    a memory device coupled to said processor; and
    a computer display coupled to said processor, wherein said computer display displays an object in a three-dimensional graphical scene based on a location of a graphical camera;
    wherein said processor is programmed to:
    identify an improved viewing location of said camera after receiving an object manipulation indication;
    move said camera from a first position and a first orientation to a second position and a second orientation based on said improved viewing location, wherein a location of the object relative to the graphical scene is maintained while said camera is moved; and
    move said camera back to said first position and first orientation after receiving an end of object manipulation indication.

11. The computer system of claim 10, further comprising a keyboard coupled to said processor, wherein said object manipulation indication is generated from pressing a key on said keyboard.

12. The computer system of claim 11, wherein said end of object manipulation indication is generated from releasing said key.

13. The computer system of claim 10, wherein object manipulation indication is generated from detecting movement of the object.

14. The computer system of claim 10, wherein said first position and first orientation define a first parallel plane, and said second position and second orientation define a second parallel plane that is perpendicular to said first parallel plane.

15. The method of claim 10, wherein said first position and first orientation define a first parallel plane, and said second position and second orientation define second parallel plane that is approximately 16–30 degrees from said first parallel plane.

16. The computer system of claim 10, said processor further programmed to:

attach a cursor to said object; and move said object when said cursor is moved and said camera is in said second position.

17. The computer system of claim 16, wherein said three-dimensional graphical scene is contained between a near plane and a far plane.

18. A computer graphics system for manipulating an object in a three-dimensional graphical scene that includes a graphical camera in a first position and a first orientation, said system comprising:

means for receiving an object manipulation indication;

means for identifying an improved viewing location of the camera for manipulating the object;

means for moving the camera to a second position and second orientation based on said improved viewing location, wherein a location of the object relative to the graphical scene is maintained while the camera is moved;

means for receiving an end of object manipulation indication; and means for moving the camera to said first position and first orientation.

19. A computer-readable medium having stored thereon instructions which, when executed by a processor, cause the processor to manipulate an object in a three-dimensional graphical scene that includes a graphical camera in a first position and a first orientation by performing the steps of:

(a) receiving an object manipulation indication;

(b) identifying an improved viewing location of the camera for manipulating the object;

(c) moving the camera to a second position and second orientation based on said improved viewing location, wherein a location of the object relative to the graphical scene is maintained while the camera is moved;

(d) receiving an end of object manipulation indication; and (e) moving the camera to said first position and first orientation.

20. The computer-readable medium of claim 19, wherein step (a) comprises detecting a pressed key of a keyboard.

21. The computer-readable medium of claim 20, wherein step (d) comprises detecting a release of said pressed key.

22. The computer-readable medium of claim 19, wherein step (a) comprises detecting movement of the object and step (d) comprises detecting a release of a mouse button.

23. The computer-readable medium of claim 19, wherein said first position and first orientation define a first parallel plane, and said second position and second orientation define a second parallel plane that is perpendicular to said first parallel plane.

24. The computer-readable medium of claim 19, wherein said first position and first orientation define a first parallel plane, and said second position and second orientation define a second parallel plane that is approximately 16–30 degrees from said first parallel plane.

25. The computer-readable medium of claim 19, wherein said improved viewing location is based on a location of said object and the three-dimensional graphic scene.

26. The computer-readable medium of claim 19, further comprising:

(f) attaching a cursor to said object; and (g) moving said cursor while said camera is in said second position.

* * * * *